(12) United States Patent
Lemström et al.

(10) Patent No.: US 6,476,870 B2
(45) Date of Patent: Nov. 5, 2002

(54) METHOD FOR ADJUSTING A PHOTODETECTOR ARRAY AND A BEAM-SPLITTING AND DETECTOR STRUCTURE FOR A LINE SCAN CAMERA

(75) Inventors: Guy Lemström, Kauniainen (FI); Mikko Ristolainen, Woodstock (CA)

(73) Assignee: TVI Vision Oy, Helsinki (FI)

( * ) Notice: Subject to any disclaimer, the term of this patent is extended or adjusted under 35 U.S.C. 154(b) by 0 days.

(21) Appl. No.: 08/848,097

(22) Filed: Apr. 28, 1997

(65) Prior Publication Data

US 2002/0093585 A1 Jul. 18, 2002

Related U.S. Application Data

(63) Continuation of application No. PCT/FI95/00596, filed on Oct. 27, 1995.

(30) Foreign Application Priority Data

Oct. 28, 1994 (FI) .................................. 945089

(51) Int. Cl.[7] .............................................. H04N 5/225
(52) U.S. Cl. ........................ 348/373; 348/337; 348/374
(58) Field of Search ........................ 348/65, 190, 267, 348/272, 259, 373, 374, 375, 340, 337; 156/272.2, 272.5, 272.7, 273.7, 275.7; 174/259, 260; 257/778

(56) References Cited

U.S. PATENT DOCUMENTS

| | | | | |
|---|---|---|---|---|
| 4,277,169 A | * | 7/1981 | Kreig | 356/141.3 |
| 4,323,918 A | * | 4/1982 | Bendell | 348/265 |
| 4,622,580 A | * | 11/1986 | Levine | 348/337 |
| 4,806,750 A | * | 2/1989 | Vincent | 250/226 |
| 4,916,529 A | * | 4/1990 | Yamamoto et al. | 348/337 |
| 5,166,506 A | * | 11/1992 | Fiete et al. | 250/201.7 |
| 5,315,384 A | | 5/1994 | Heffington et al. | |
| 5,341,213 A | | 8/1994 | Giroux | |
| 5,345,335 A | | 9/1994 | Costrop et al. | |
| 5,715,022 A | * | 2/1998 | Takamatsu et al. | 348/759 |
| 5,894,368 A | * | 4/1999 | Yamanaka | 348/337 |

FOREIGN PATENT DOCUMENTS

| | | |
|---|---|---|
| EP | 541092 | 11/1992 |
| EP | 606018 | 12/1993 |
| JP | 63-90985 | 4/1988 |
| JP | 1-196979 | 8/1989 |
| JP | 4-38407 | 2/1992 |
| JP | 4-235475 | 8/1992 |
| JP | 4-290090 | 10/1992 |

\* cited by examiner

Primary Examiner—Wendy R. Garber
Assistant Examiner—Mitchell White
(74) Attorney, Agent, or Firm—Altera Law Group, LLC

(57) ABSTRACT

The present invention relates to a method for adjusting a photodetector array, and a beam-splitting and detector structure for a line scan camera, which structure comprises a photodetector array which is protected by a casing (10) from at least the back, and adjusted to the focus plan of an objective and glued to the exit surface focus plane of an objective and glued to the exit surface of the beamsplitting prism (2) by means of a support and adjusting structure. According to the invention, the supporting and adjusting structure comprising a glue layer (6) arranged between edges (19) surrounding the photodetector array (1) in the casing (10) and the exit surface (4) of the beam-splitting prism.

16 Claims, 1 Drawing Sheet

Figure 1:
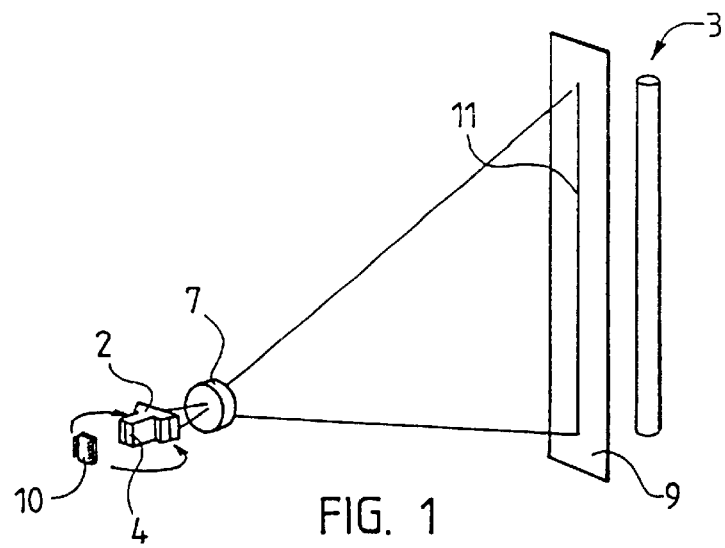

METHOD FOR ADJUSTING A PHOTODETECTOR ARRAY AND A BEAM-SPLITTING AND DETECTOR STRUCTURE FOR A LINE SCAN CAMERA

This is a continuation of PCT/FI95/00596 application filed Oct. 27, 1995.

The present invention relates to a method for adjusting a photodetector array, and a beam-splitting and detector structure for a line scan camera, which structure comprises a photodetector array which is protected by a casing from a. least the back, and adjusted to the focus plane of an objective and glued to the exit surface of the beam-splitting prism by means of a support and adjusting structure.

Based on the U.S. Pat. No. 4,323,918 and the Japanese Patent 63-90985, adjusting structures are known in which the photodetector array is glued to the exit surface of the beam-splitting prism by using a spacer between the photodetector array and the beam-splitting prism. In the U.S. Pat. No. 4,323,918, the spacer is placed between the beam-splitting prism and the photodetector array, and thus, the spacer must be accurately measured. In the solution according to the Japanese Patent 63-90985, the photodetector array is glued between holding blocks whereby it is possible, prior to glueing, to move the photodetector array with regard to the holding blocks, and thus it is unnecessary to use prism-specific spacers. The U.S. Pat. No. 4,916,529 also discloses a solution in which the surfaces of both the beam-splitting prism and the photodetector array have first been processed to be solderable, and following this, the adhering has been carried out with, for example, ordinary soldering tin which at the same time determines the distance of the photodetector array from the exit surface of the beam-splitting prism. The problem with the two solutions mentioned first is the need to use separate spacers, which both complicates the production and makes assembly more difficult. The problem with the solution mentioned latest, in turn, is the need to separately prepare both the beam-splitting prism and the photodetector array for the soldering, and especially the troubles of the actual soldering and the associated thermal problems.

The U.S. Pat. No. 5,315,384, in turn, discloses an adjusting method in which an alignment target generated by three point sources of light arranged in a line is employed, and on the basis of the image provided by the alignment target, a manual rough adjustment is first carried out for the photodetector array by means of a micrometer, and then a fine adjustment is carried out by an electromechanic manipulator. It is, however, difficult to obtain feedback from the photodetector array as the dark section between the source lights does not give any signal. Thus, it is necessary for the photodetector array to be located nearly on the same line with the source lights before a signal required for adjustment is obtained. Finally, the photodetector array is adhered to the exit surface of the beam-splitting prism by glueing between them a spacer through which ultraviolet light can penetrate. Said glueing is so carried out that the spacer is first glued onto the surface of the casing of the photodetector array with ultraviolet light-sensitive glue, and the opposite side of said spacer is also glued with ultraviolet light-sensitive glue to the exit surface of the beam-splitting prism. In this adjusting method, it is necessary to use spacers of carefully chosen material, of accurate measurements and manufacturing in order to avoid unnecessary reflections from the surfaces of the spacers and, on the other hand, in order to focus the photodetector array in an optimum manner. It is, furthermore, required that the spacers be chosen photodetector array specifically.

It is an object of the present invention to introduce a beam-splitting and detector arrangement, as well as an adjusting method for a photodetector array, by which method it is possible to get rid of spacers that are expensive and difficult to manufacture, and their photodetector specific selection, and nevertheless be able to carry out the adjusting reliably and accurately by a method which can easily be automatized and which does not require a manual coarse alignment phase. This object is achieved by a beam-splitting and detector structure according to the invention, which structure is characterized in that the support and adjusting structure of the photodetector array comprises a glue layer arranged between the edges of the casing surrounding the photodetector array and the exit surface of the beam-splitting prism. By means of this glue layer, it is on the one hand possible to adhere the photodetector array to the exit surface of the beam-splitting prism, and on the other hand, which is particularly essential as far as he present invention is concerned, when the glue is still fresh, the thickness of the glue layer can be regulated so as to adjust the photodetector array to the focus plane of the objective.

It is characteristic to the method of the invention for adjusting the photodetector array to the focus plane of the objective that it comprises the following steps, in which a line-formed light, or a light of line-formed portions, is directed from the alignment target through the beam-splitting prism to its exit surface;

the photodetector array is positioned near the exit surface of the beam-splitting prism so that the element array intersects with the line-formed image of the alignment target on the exit surface;

the photodetector array is adjusted with regard to the line-formed image which is on the exit surface of the beam-splitting prism so that light levels of the detectors of the photodetector array essentially correspond to each other, and the photodetector array is supported by its casing to the beam-splitting prism.

The method of the invention, thus, utilizes an electric signal produced by the photodetector array itself. Monitoring of said signal enables carrying out an optimal alignment. The method of the invention also enables compensation for Potential position errors between the photodetector array and its casing, because the photodetector array is now adjusted to the correct position (focus plane) regardless of its position in the casing. This is based on the fact that instead of solid spacers, the photodetector array is adhered by its casing to the exit surface of the beam-splitting prism by means of a glue layer most advantageously adjustable in thickness, which apart from enabling adjustments of distance also enables various kinds of inclinations of the casing with regard to the exit surface of the beam-splitting prism.

Thus, it is also possible that the method of the invention comprises an additional step in which the photodetector array is, after the adjusting to the focus plane, inclined to a desired angle with regard to the focus plane of the beam-splitting prism. By this method, the errors which are caused due to the line camera being positioned inclined with regard to the target, can now be compensated for by the desired inclination of the photodetector array.

What is significant in the method of the invention is that the solid spacer is replaced by a glue layer. The glueing advantageously comprises the steps in which the photodetector array and the beam-splitting prism are drawn apart from each other glue is spread on the edges of the photodetector array casing, the photodetector array is moved back to the adjusted distance from the beam-splitting prism;

the glue is allowed to harden/the glue is hardened, and the junction between the casing of the photodetector array and the beam-splitting prism is sealed with glue.

Accordingly, the adjusting is carried our prior to the glue spreading. This ascertains that the adjusting succeeds. Alternatively, and especially in cases where the adjusting has become a frequently repeated routine, the procedure may comprise the following steps in which prior to positioning the photodetector array close to the exit surface of the beam-splitzing prism, the glue used in the gluing is spread on the edges of the photodetector array casing, the glue is hardened after the adjusting, and the junction between the casing of the photodetector array and the beam-splitting prism is sealed with glue.

The glue may be spread on the edges of the casing most advantageously as glue spots or as a glue line.

As the method of the invention is being employed, the method may additionally comprise a step in which prior to positioning the photodetector array close to the exit surface of the beam-splitting prism or prior to the possible spreading of the glue on the edges of the casing, the protective glass of the photodetector array casing is removed. Removing of the protective glass results in better sensitivity of the photodetector array, because one glass layer preventing the propagation of light, and reflections on the surfaces of said glass, are thereby removed.

Figure 3:
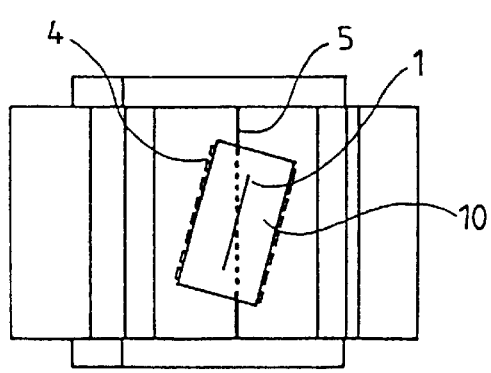
Figure 4:
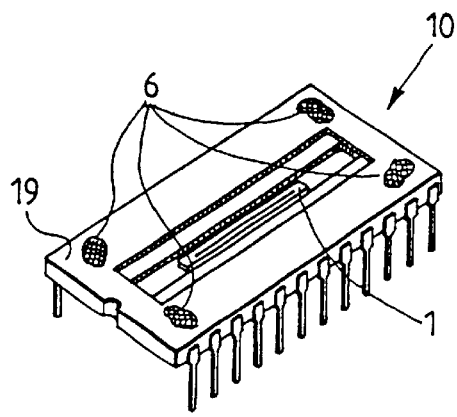
Figure 2:
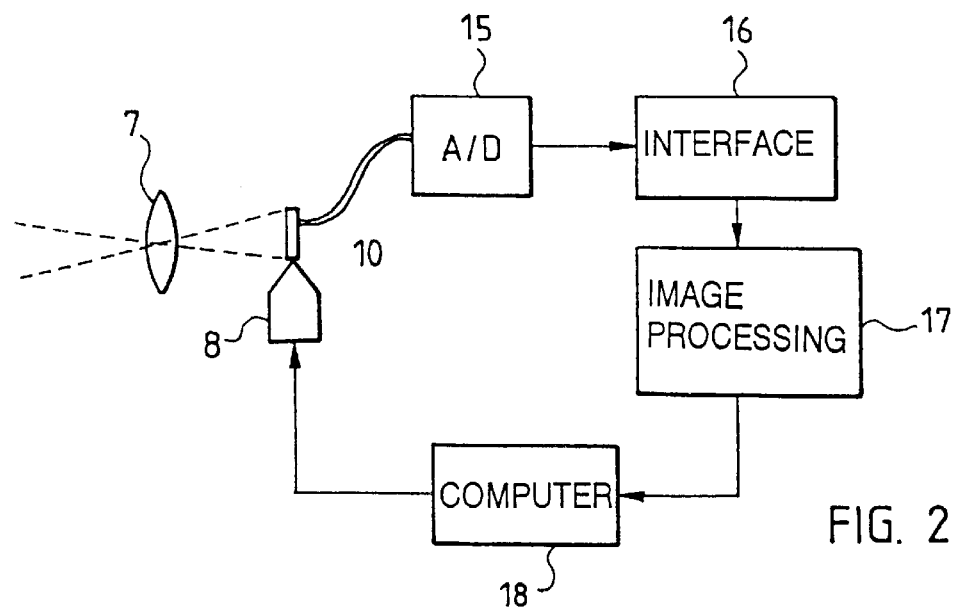

In the following, the invention will be described in greater detail with reference to the accompanying drawing in which FIG. 1 illustrates the basic principle of the adjusting method of the invention, FIG. 2 illustrates a block diagram of equipment used in the adjusting, FIG. 3 illustrates the position of the photodetector array in the beginning of adjusting as seen from the back, and FIG. 4 illustrates the spreading of glue spots on the photodetector array casing.

The method of the invention is based on utilizing the operating principle of the camera. This operating principle is illustrated in the block diagram of FIG. 2. In the diagram, light is directed from the alignment light source through camera optics 7 and the beam-splitting prism (not shown in FIG. 2) to the photodetector array which in the following, on the basis of its most typical implementation, will often be referred to as a CCD detector. The CCD detector is arranged in casing 10. The light levels detected by the CCD detector elements are forwarded to an A/D converter 15 which converts the signals into a digital form. Following this, the signals are transmitted through a suitable interface circuit 16 to an image processing circuit 17 and from that further to a computer 18. The computer 18 interprets the signals it has received from the image processing circuit, and, on the basis of them, controls a motorized adjusting mechanism 8 by means of which the CCD detector is adjusted to a desired focus plane.

In a practical embodiment of the invention, a camera is used in which the CCD detectors 1 and the beam-splitting prism 2, which separates the light into two or more spectral bands or beams, are separate for the assembly. In addition, the method comprises a light source 3 producing a line-formed beam, or a beam of line-formed portions, and an image processing system (blocks 15, 16, 17 and 18 in FIG. 2). The principle of alignment is shown in FIG. 1. The beam required for the alignment is produced by a light source containing a very accurate line-formed light aperture 11 in its covering plate. The covering plate 9 is the most accurate part of the light source. In order to enable horizontal assembly position of the prism, the lighsource is in vertical position. The light source must be able to generate a beam through the light-splitting prism the width of which beam optimally corresponds to the length of one detector element of the photodetector array. In such a case, the adjusting method of the invention can be carried out in the most accurate manner possible.

In the method, the objective 7 is directed to a line-formed beam of the light source 3 thereby causing the beam to deflect through optics to the exit surfaces 4 of the prism 2 along optical axes. The CCD detector 1 mounted to the adjusting mechanism 8 is coupled by electronic means to the image processing system, and the alignment is carried out by means of an image signal indicated by the CCD detector. As the CCD detector is taken near the beam which is deflected to the exit surface of the beam-splitting prism, the elements of the CCD detector detect the beam, and the image signal produced generates feedback. The CCD detectors, of which there are three in a typical colour line scan camera, are aligned and mounted one at a time by means of the image signal obtained from the detectors to correspond to the direction of the beam. Thus, the alignment may be based on, as concerns all the detectors, only to the image of the alignment light source on the corresponding exit surface of the beam-splitting prism, but alternatively, as the second and third photodetector are being aligned, the only aim may be that all the photodetectors give a similar image of the alignment light source, i.e. that the light levels of the photodetector array elements corresponding to each other are as similar as possible.

In the method of the invention, it is possible to mount the CCD detectors accurately into position, as the alignment is carried out on the basis of the image signal from the photodetector. Consequently, the errors in the entire adjusting sequence are eliminated as the feedback is obtained directly from the object which is to be adjusted. The proceeding of the alignment can at all times be monitored. The operation of the component procured can be checked as the operation of the component during assembly is identical to its operation in the camera. Automatization of the method can easily be accomplished by means of the optoelectronic feedback obtained from the image processing system.

The assembly consists of two main stages which are the alignment of the CCD photodetector 1 to a correct position by means of the light beam, and the adhesion of the adjusted detector to the surface 4 of the prism 2.

The alignment is carried out in a computer-assisted way. A feedback control algorithm adjust the detector to a position meeting the alignment requirements.

The quality of the image and colour separation of a colour line scan camera to a great extent depend on the positions of the CCD photodetectors on the surfaces of the beam-splitting prism and with regard to each other. Even the slightest deviation in position of the photodetector array with regard to the optical axis and with regard to each other deteriorates the image quality. As far as colour separation and the sharpness of the image are concerned, optical overlaying of the elements of the three photodetector arrays is the most essential requirement in the adjusting.

Apart From the correct positions the correct focusing distances of the CCD detector elements must be taken into account. The optical distance must be as closely as possible the same for each element of the photodetector array in order for every element to be focused correctly and the light exposure of the element array to be balanced. The light exposure is most efficient on the focus plane when the image is focused on the surface of the element array of the detector. If the element array of the CCD detector is inclined in the axial direction with regard to the prism surface, the focusing distances of the elements alter and the light exposure deteriorates at the ends of the detector. The inclination differences especially affect color separation, because the light exposure of colour components is not in such a case balanced, and the shades, as a result, do not match reality. The image will also be out of focus, which, in turn, also has an affect on the separation capability.

The size of individual photodetectors of the photodetector array is typically 13×13 micrometres, or less. In order to procure an acceptable image, the optical overlaying of the CCD detector elements should be at least 90%.

With conventional methods, it is not possible to reach aforementioned accuracies, but it is necessary to employ special techniques in the implementation of alignment mechanics.

The alignment mechanics can be implemented by motion elements used in the adjusting of optics, and by motors designed for very accurate motion. The mechanics can in such a case be assembled by using ready-made assembly elements, and it is possible to mount micro motors to the elements for replacement of manual micro screws. The alignment mechanism may thus comprise three motion elements producing linear motion, the directions of motion being perpendicular to each other (x, y and z directions), and two rotational elements whose rotation levels are perpendicular to each other (rotation around z-axis in the x-v level, and rotation around x-axis in the y-z level if the photodetector array is parallel to y-axis, and its casing level is identical with x-y level). This is how it is possible to get rid of motion elements equipped with manual micrometer screws, which caused problems especially in the achieving of an accurate enough adjusting, and also as regards tremble and vibration cf the mechanism, which result from touching during the assembly process.

The surfaces of parts to be adjusted with regard to each other have a considerable influence on the success of the setting. There is usually a protective glass on the surface of the CCD, and if said glass touches the surface of the glass prism, dry adhesion will develop between the surfaces. Due to this fact, the setting will become much more difficult.

The problems caused by friction in the setting can be avoided if the glass alignment surfaces are kept apart in the alignment. Then, however, the protective glass on the surface of the CCD, the prism and the air layer in between cause detrimental reflections. These are caused by the glass—air and air—glass interfaces reflecting some of the light.

The solution to the problem of reflections is to use a CCD detector without a protective glass. The risk for the detector to get dirty or to be damaged due to environmental conditions, such as humidity, is greater in such a case, but it can be minimized by impurity-free space arrangements. The metal surfaces of the detector have been passivized and thus no protective gasses or other special procedures are required during removal of the protective glass.

If the glass surface of the CCD detector is removed, the number of deflecting interfaces will not increase and, so, no reflection problems occur. On the other hand, as the adhering surfaces become smaller, it is more difficult to adhere the detector to the prism. The detector, then, has to be adhered to the prism by the edges of the casing supporting the photodetector array, the edges being indicated by reference number 19 in FIG. 4.

In the automatized alignment method of the invention, a computer controlled moving mechanism adjusts the CCD detector to a desired position with regard to the prism surface. An optoelectronic feedback setting algorithm searches for the detector a position in which the predetermined alignment requirements are met.

In the adjustment process, the photodetector array 1 is positioned close to the exit surface 4 of the beam-splitting prism 2 so that the element array 1 intersects with the line-formed image 5 of the alignment target on the exit surface. In such a case, it is certain that the photodetector array intersects with the image 5, and feedback information is thereby obtained from it. Following this, the photodetector array is moved to the focus plane in the z-axis direction by monitoring the light level signal obtained from the photodetector array. As the signal reaches its maximum level, the distance from the exit surface is correct, and the intersection of at least the photodetector array and image 5 is in focus plane. The following step is to unilateralze the detector array with the light beam by rotating the edges of the detector towards the beam in the x-y level or around the z-axis. During the rotation, the control maintains the intersection of the beam and the detector array continuously in the focus plane. The light level distribution supplied by the detector gradually begins to smooth as the edge elements of the detector approach the beam. When the light level distribution is even enough, the algorithm adjusts apart from the parallelism of the detector also the element array to the right position in the longitudinal direction with regard to the beam. As soon as the right position has been found, the automatism discontinues and the detector can be adhered to the prism.

During the alignment, on the basis of the light level distribution produced by the CCD detector, a parameter indicating the uniformity of the light level distribution achieved is calculated with continuous updating. The parameter is compared to a discontinuity condition indicating an acceptable level accuracy of the alignment. The alignment automatism discontinues as the alignment parameter reaches the discontinuity condition.

In order to have the photodetector array in the correct position in the longitudinal direction of the array as well, alignment marks creating dark peaks to the light level distribution in the light aperture of the light source are utilized. By adjusting a certain photodetector of the CCD detector to the dark peak, the element array can be adjusted in its longitudinal direction as well.

A type of glue whose optical properties correspond to the ones of glass has conventionally been used for the mounting of the CCD detector. The glue has formed a thin, uniform, glass-like layer between the prism and the protective glass of the CCD detector. The use of the adjusting method of the invention and the possible removal of the CCD protective glass also allow the use of non-optical glues while they cause some changes in the glueing techniques.

In the method of the invention, the glue need not be optical if it is not used in the light propagation path. The glues used by the electronic industry, such as epoxy glues, can be applied if their properties are suitable for the mounting of the detector and their viscosity suits the purpose.

In the adjusting process, the surfaces are either pressed against each other or drawn apart, whichever is required, in order to achieve the desired focusing distance. The glue must be elastic enough for it to be able to follow the movement of the mounting surfaces during the mounting. The thickness of the glue layer during the mounting is approximately 0.3 mm or more, but advantageously less than 2 mm. In the case of a photodetector array with a protective glass, optical glue spread all over the surface of the protective glass may be used, or non-optical or optical glue between the edges surrounding the photodetector array and the beam-splitting prism. Only the latter glueing method is possible in the case of a photodetector array without a protective glass.

It is necessary that the glue only has a small hardening shrinkage. Uneven hardening of the glue easily causes tensions due to shrinkage on the surfaces to be mounted, which tensions may make the mounting surfaces move. The glue used in the assembly is only allowed a maximum hardening shrinkage of one percent. It is possible to lower the risks of the hardening shrinkage in the beginning of the mounting by applying the glue as spots, because the tensions caused by the uneven hardening of the glue are then smaller.

The hardening time of the glue has a considerable influence on the assembly time. With a short hardening time, the risk of the mounting surfaces to move is small. On the other hand, use of a very fast hardening glue may be controversial. A short hardening time may result in assembly errors, if it becomes imperative to hasten the mounting.

The requirements of assembly are best met by a glue whose hardening may be initiated in a controllable manner by using a catalysator such as ultraviolet light, for example. It is, furthermore, usually possible to boost the hardening of glues by raising the temperature. This, however, leads to a high risk of damages due to thermal expansion.

It is also required that the glue can endure uncondensated humidity in the range of 5–90%. Vibration and shock resistance must be at least up to the requirements of electronics.

There are several alternative glues which are both suitable for the purpose and meet the mechanical requirements. In the method, it is possible to employ two-component glues which are intended for joining optical components and whose characteristics can be regulated by varying component proportions. The alternatives are single-component or multiple-component glues which are hardened by ultraviolet light. These glues are simple to handle, they can be dealt with over a long period of time, and the initiation of hardening is controllable.

In the method according to the invention, the mounting phase immediately succeeds the adjusting phase which is carried out with no glue. As soon as the detector has been adjusted to the desired location and position, the alignment motions are locked into position. Following this, the photodetector is only moved perpendicularly with regard to the prism surface in order to carry out the glueing.

The aligned CCD detector and the prism are drawn apart from each other to apply the glue on the CCD surface. The CCD detector equipped with glue is moved by a perpendicular motion back to its adjusted distance from the prism. As soon as the detector is in correct position, the glue is either hardened or it is left to harden depending on the type of glue used. As the glued areas are hardening the detector adheres to the prism surface. Following this, the junction is strengthened and sealed by glueing the detector from its edges to the prism.

In the first phase, very little glue is applied and only as spots or lines onto small areas, for example, in the corners or the broad edges of the detector. Such glue spots are illustrated by reference number 6 in FIG. 4.

By glueing the detector first in small spotlike areas, the surfaces can be hardened fast whereby the risk of defects caused by the hardening shrinkage or the movement of surfaces is lower.

Alternatively, the CCD detector can be adjusted equipped with the glue spots. This can be done especially as soon as the adjusting has become a routine procedure in the camera assembly.

The method of the invention also provides a possibility for positioning the CCD detector in the desired inclination with regard to the focus plane of the beam-splitting prism. The starting point here is the same as described above, except that following the adjusting, the adjusting mechanism is given a command to incline the CCD detector to the desired inclination with regard to the focus plane of the beam-splitting prism. Then, the CCD detector is glued in the inclined position to the exit surface of the beam-splitting prism. The glueing procedures may be such as described above, i.e. the glue may be applied as appropriate soots spread on the COD detector edges, or the glue is applied to these surfaces only after the inclination as soon as the CCD detector is first moved to the correct distance from the beam-splitting prism. Using such controlled inclination provides line scan cameras with numerous new uses. By means of this kind of inclination it is possible to compensate for various kinds of misalignments whichare caused if it is necessary to adjust a line scan camera in an inclination wit regard to the object being monitored by it. Obviously, such a inclination alternative also provides an easy an simple way to compensate for any inclination error between the CCD photodetector array and its casing. Such a minor correction is automatic in the adjusting method of the invention.

In the above, the method of the invention is only described by means of exemplary embodiments, and it should be understood that it may be varied without departing from the scope determined in the attached claims.

What is claimed is:

1. A beam-splitting and detector structure for a line scan camera, comprising:
   a beam-splitting prism;
   a photodetector array mounted in a protective casing to protect at least a back of the photodetector array; and
   a supporting and adjusting structure disposed between an exit surface of the beam-splitting prism and the protective casing having a thickness adjusted to set the photodetector array at a focal plane of an objective, wherein the support and adjusting structure includes cured adhesive arranged between the edges of the protective casing surrounding the photodetector array and the exit surface of the beam-splitting prism to set a spacing between the edges of the protective casing and the exit surface, the adhesive allowing movement of the photodector array during adjustment to the focal plane.

2. A beam-splitting and detector structure as claimed in claim 1, wherein a junction between the casing of the photodetector array and the beam-splitting prism is sealed.

3. A beam-splitting and detector structure as claimed in claim 2, wherein said junction is sealed with adhesive.

4. A beam-splitting and detector structure as claimed in claim 1, wherein the photodetector array is inclined to a desired inclination with regard to the focus plane whereby the adhesive at one end of the photodetector array is thicker than at its other end.

5. A structure as claimed in claim 1, wherein there is no adhesive positioned on an optical path between the photodetector array and the exit surface of the beam-splitting prism.

6. A method for adjusting a photodetector array to an objective focus plane in a line scan camera, and mounting the photodetector array, in the focal plane, to the exit surface of the beam-splitting prism using a support structure, the method comprising:

directing a line-formed image, formed from one of a light line and a light of line-formed portions, from an alignment target through a beam-splitting prism to the exit surface of the prism;

positioning the photodetector array near the exit surface of the beam-splitting prism so that the photodetector array intersects with the line-formed image, the photodetector array being mounted in a casing having a hardenable adhesive applied on a peripheral casing edge, the adhesive contacting the exit face;

adjusting a position of the photodetector array relative to the line-formed image so that the photodetector lies in the focal plane; and fixing the photodetector lying in the focal plane relative to the prism by hardening the hardenable adhesive contacting the exit face;

wherein the hardenable adhesive allows adjustment of the position of the detector including tilting the detector.

7. A method as claimed in claim 5, wherein the photodetector array is fixed by its casing directly to the exit surface of the beam-splitting prism.

8. A method as claimed in claim 5, further comprising inclining the photodetector array to a desired angle with regard to the focus plane following the adjusting step.

9. A method as claimed in claim 6, wherein the adhesive is spread as spots and after the adhesive has been hardened or it has hardened, the junction between the casing of the photodetector array and the beam-splitting prism is sealed.

10. A method as claimed in claim 9, characterized in that wherein the junction between the casing of the photodetector array and the beam-splitting prism is sealed with adhesive.

11. A method as claimed in claim 5, further comprising:

removing a protective glass of the photodetector array casing prior to adjusting the position of the photodetector array to lie in the focal plane.

12. A method as claimed in claim 5, wherein the hardening of the adhesive comprises targeting ultraviolet light to the adhesive.

13. A method as claimed in claim 6, wherein the width of the line-formed light beam, or one consisting of line-formed portions, on the exit surface of the beam-splitting prism essentially corresponds to the width of an element of the photodetector array.

14. A method as claimed in claim 5, further comprising monitoring a signal from the photodetector array caused by the line-formed image while adjusting the position of the photodetector array.

15. a method as claimed in claim 5, wherein fixing the photodetector relative to the prism with a hardenable adhesive includes disposing the adhesive along portions of at least one edge of a photodetector array casing prior to adjusting the position of the photodetector array and hardening the adhesive after the photodetector array is positioned in the focal plane.

16. A method for adjusting a photodetector array to an objective focus plane in the line scan camera, and mounting it in this position to the exit surface of the beam-splitting prism by means of a support structure, comprising:

directing a line-formed light, or a light of line-formed portions, from an alignment target through a beam splitting prism to its exit surface;

positioning the photodetector array near the exit surface of the beam-splitting prism so that the photodetector array intersects with a line-formed image of the alignment target on the exit surface;

supporting the photodetector array by its casing to the beam-splitting prism with glue;

adjusting the supported photodetector array with regard to the line-formed image which is on the exit surface of the beam-splitting prism, including tilting the photodetector array, so that light levels of the detectors of the photo detector array essentially correspond to each other;

prior to positioning the photodetector array close to the exit surface of the beam-splitting prism, spreading the glue on the edges of the photodetector array casing, wherein the glue allows positioning of the photodetector array during the adjusting step; and hardening the glue after the adjusting step.

* * * * *